Patented Dec. 17, 1935

2,024,647

UNITED STATES PATENT OFFICE 2,024,647

MARGARINE AND METHOD OF MANUFACTURING SAME

Adrian D. Joyce, Cleveland, Ohio, assignor to Durkee Famous Foods, Inc., Elmhurst, N. Y., a corporation of Illinois No Drawing. Application May 5, 1931, Serial No. 535,289

4 Claims. (Cl. 99—13)

This invention relates to margarines and to methods of manufacturing the same.

The manufacture of margarines in the prior art has required a rather elaborate procedure with resultant lack of economy. Relatively large quantities of milk or milk products are required in order to secure the desired taste and flavor, and numerous steps of admixture and incorporation of the several ingredients is necessitated in the elaborate procedures required in the prior art for the manufacture of such margarines. Since the present invention is concerned with improvements in the methods of manufacturing such margarines, and improvements in the products themselves, the following exemplary procedure of the prior art in the manufacture of margarine is given. Margarine is, of course, utilized as a substitute for dairy butter. Dairy butter ordinarily may be looked upon as a mixture of butter fats, about 80%, together with moisture, salt and milk solids other than butter fats. The flavor is primarily due to the action of bacteria working on milk solids in the presence of the butter fat. Pure butter fat from fresh cream is practically odorless and tasteless. The flavor in dairy butter is produced almost entirely as a result of the bacterial action on the milk solids, and also to a very slight extent because of this action in the presence of the butter fat. In producing margarines, the first consideration is the fat vehicle that is to be employed to replace the butter fat of dairy butter, and vegetable and animal oils and fats are selected for the purpose with this end in view. The fat mixture obtained is emulsified with ripened skim milk and then crystallized or congealed, such crystallization or congealing being effected as rapidly as possible to prevent any separation of the milk from the blended oils, and also to prevent any graining out or separation of stearine crystals from the fat portion itself. A flavor of dairy butter is added to the fat base for margarine by the addition of this ripened skim milk, which is prepared from a starter of whole milk with a regular milk culture. The following is a more detailed method usually employed in the manufacture of margarines. The oils in a fluid state are first blended at a temperature which is as low as possible and which will not permit any congealing in the oil mixture to take place. For example, in the preparation of nut margarine, the temperature employed is usually about 85° F. depending somewhat on the constitution of the oil mixture employed. The blend of oils is introduced into an agitating tank usually provided with a jacket for cooling or heating purposes, provision being made for rapid agitation. Such apparatus is usually referred to as a churn. After the oils are introduced, the cultured ripened milk is introduced slowly during agitation, generally from 35 to 40% of cultured ripened milk based on the weight of the oil being employed. The agitation is kept up for 15 or 20 minutes, or until an emulsion has been formed between the different oils and the milk, and in this form it is customary to let it run by gravity or under pressure through spray nozzles into cold water under agitation. The idea being to congeal the emulsion as quickly as possible, and to prevent any separation, at the same time minimizing to some extent the amount of milk that becomes dissolved in the water present. The temperature of this water is preferably kept as close as possible to freezing, and should be held between 32 and 40° F.

The emulsion congeals or crystallizes quickly and comes to the surface of the water bath from which it is flowed or conveyed into trucks or into a subsequent warmer bath, which removes from the crystals, in a more or less uniform way, the excessive cold temperature that is no longer required. When the crystals are not handled through such second warmer water bath, they are carried in trucks to a tempering room and allowed to remain at a temperature of approximately 70° F. or thereabout for from 12 to 24 hours in order to remove the excessive cold, so that when put on the working table, the crystals are more rapidly kneaded together into a butter-like mass.

The second warmer bath removes more quickly the excessive cold temperature of the crystals, and permits them to soften so that almost immediately they are ready for the working table.

On the working table, the crystals are kneaded together, and excessive moisture is worked out, so that the remaining moisture content in the product at this point is generally not more than 12 or 13%. It is also customary to add salt and any preservative, such as benzoate of soda, on the working table, in order to secure intimate and thorough intermixture of such materials with the butter-like mass of margarine. It has frequently been customary to take the product from the working table, and put it in small batches of from 100 to 600 pounds into a dough mixer or blending machine, in order to give the product a more thorough and intimate mixing.

This process usually lasts but a few minutes, and some manufacturers will at this point also add 2 or 3% of additional ripened skim milk with the intention of improving the flavor of the product. The blender or dough mixer also has the effect of whitening the product and improving its appearance.

From the blending machine, the product passes to the print cutter and wrapping machine, from which the goods are packed ready for shipment.

Some manufacturers instead of using a cold water crystallizing vat find it desirable to congeal the emulsion of oils and milk on a chill roll, a revolving cylinder in which cold brine is circulating. The emulsion runs on to this cold surface revolving slowly at the rate of 10 to 15 revolutions per minute, on which the emulsion congeals in making a full revolution, so that it can be scraped off in the congealed form with a knife. This is, of course, another way of bringing about a quick congealing of the emulsion, and in this case there is the advantage of no loss of milk or milk solids through the crystallizing water used in the other case. Therefore, a smaller amount of milk can be used. From the chill roll, the product will usually go to the working table or blending machine in order to thoroughly incorporate the mass, and bring the product into a more plastic consistency in which form it is ready for the printing and wrapping machines.

These prior art methods of manufacturing margarine and the margarine products themselves are open to a number of objections. The prior art processes of manufacture require a large number of steps as illustrated above which increase the cost of manufacture. The margarine of the prior art contains a very large water content which enters primarily through the introduction of the milk products and renders such margarines generally unsuitable for the usual cooking and frying operations. Further the margarines because of the content of milk or milk solids require very careful marketing, and in general may be said to require much the same conditions of handling that is required by butter and other similar dairy products. For example, refrigeration is necessary and rapid distribution is essential, so that the products may be as fresh as possible, the products being handled in retail stores under refrigeration similar to dairy products, and being susceptible to spoiling with resultant expense and loss. The elaborate steps of manufacture are largely necessitated by the fact that the milk or milk products that are introduced into the blended oils, are always introduced while the oils and fats are in a fluid condition, prior to the fluid emulsion being congealed on the chill roll or in cold water.

Among the objects of the present invention is the manufacture of margarines by relatively simple and economical methods.

A further object of the present invention is the production of margarines of novel characteristics.

Other objects and advantages will appear from the more detailed description given below, it being understood however that this more detailed description is given by way of explanation and illustration only and not by way of limitation, since various changes therein may be made by those skilled in the art without departing from the scope and spirit of the present invention.

In accordance with the present invention, a desired blend of oils or oils and fats or of fats to be used as the margarine base is first prepared, and this oil and/or fat composition is then chilled or congealed prior to any introduction of any milk or milk products. The blended oil and/or fat composition thus obtained is stable and not perishable and keeps indefinitely, so that it may be shipped to any particular point where margarine is to be produced from such material.

The oil and/or fat admixture may be any desirable mixture of oils and/or fats, such as have heretofore been utilized in the manufacture of margarines in the prior art. But preferably a margarine base is utilized of such character that it is stable and unperishable so that it may be shipped to any point where the margarine is to be produced. Various fats and oils may be employed in producing the margarine base or admixed oil and/or fat composition. Cocoanut and palm oil compositions are particularly emphasized, but other mixtures of oils suitable and adaptable to the purposes in hand may be employed, including the untreated oils or hydrogenated or otherwise treated oils. In the preferred instances, the margarine base is preferably made from oils and fats that possess properties of digestibility and palatability comparable with that of butter fat. Cocoanut oil, palm kernel nut oil and palm oil compositions are particularly of this character, but as noted other oils either treated or untreated may be employed as well as fats, etc. For example, partially hydrogenated or certain portions of liquid cotton oil, peanut oil, soya bean oil, or any of the well known vegetable oils that can be compounded or mixed in with the other oils referred to, or straight peanut oil, straight palm kernel nut oil, straight palm oil, or any oil that can be hydrogenated to the point which will be the melting point to withstand summer temperatures, or to a point not greater than the temperature of the mouth, and which oils are suitable for reenforcing or replacing the butter fat ordinarily present in whole milk may be employed. Liquid oils or hydrogenated mixtures of liquid oils compounded with certain hydrogenated oils of sufficient melting point to raise the melting point of the mixture of the hydrogenated oils and the liquid oils to the temperature that will withstand summer temperatures without melting, and yet have a melting point under the temperature of the mouth are suitable, if edible.

A typical example of a composition for producing such margarine base in accordance with the present invention is given below:

20% 110° melting point cocoanut oil
25% refined and treated decolorized palm oil melting point 101 to 102°
55% cocoanut oil melting point 76–78° F.

These components may be mixed or blended in any desired manner, and the mixture thus obtained is referred to herein as the margarine base which may be employed for subsequent treatment to be converted into the margarine. The particular type of product set forth above made from the stated ingredients, cocoanut oil and palm oil given in the above example, yields a product having a melting point of approximately 90° F., and preferably has a low water content not above 1%. Such margarine bases as that referred to above, having a melting point below 98° F. and a water content of not over 1% are utilizable directly as shortenings. In chilled condition they possess flow properties that enable them to be packaged directly either for shipment and use as shortenings, or else for shipment to the point of manufacture of margarines when the margarine is not made at the same plant where the margarine base material is produced.

The manufacture of margarines from such compositions may follow any desired procedure.

One of the features of the present invention is concerned with the chilling of such margarine bases prior to any incorporation of milk or milk ingredients. The margarine base is congealed or chilled in any desired manner, and it is then incorporated with the milk or milk ingredient to be employed, together with any salt or preservative, such as benzoate soda, that is to be introduced, such incorporation of milk and the other ingredients being desirably carried out on the blending machine. Any color that is to be included may be introduced at the same time on the blending machine. For example, utilizing the margarine base of the specific composition given in the above example, upon chilling, the margarine base is in a supercooled condition, and has not yet crystallized, so that it is fluid enough to be readily employed in the blending operation. Such material in this condition takes up the milk or milk ingredients with evident avidity, so that incorporation of the milk or milk ingredients is readily produced.

The milk or milk ingredient employed may be any desired milk component, such as powdered milk, sweet milk, condensed milk, buttermilk, or sour milk with or without any water; other milk components including evaporated milk, sweet cream, sour cream, etc. may be utilized. The margarine base particularly when fairly soft takes up such milk products with avidity, and a very simple manipulative step is all that is required to bring about the desired combination or emulsion.

When salt is also introduced, together with the milk components, etc., the salt may be dissolved in the milk before admixture with the shortening in order to avoid any graininess of the undissolved salt in the product. Further in order to facilitate the incorporation of the milk components with the fats, colloids or emulsifying agents may be included with the milk components, such colloids and emulsifying agents including the usual derivatives of glycerine, lecithin, albumen, gelatin and similar emulsifying agents.

In the manufacture of margarine on a commercial scale from the margarine base, such as that specifically given above, the desired quantity of milk components may be introduced in the blender together with salt and any other additions desired, and from there the final composition simply sent to the print machine. For example 20% ripened milk (skim) may be employed for incorporation with the margarine base specifically referred to above.

Such a method of manufacture of margarine from the margarine base materially economizes the prior art processes of margarine manufacture. While the margarine bases such as that specifically given above may be utilized in the preparation of margarine by any of the prior art processes, the utilization of the simplified process as illustrated above for the production of margarine from such margarine base is particularly desirable, economically and industrially because of the elimination of many of the prior art required steps, and the resulting simplification of the process of manufacture, and also because the product itself is materially improved by the methods of manufacture set forth herein.

Instead of following the procedure outlined above wherein the congealed or chilled product is sent to the blender, the following procedure may be utilized for the production of margarine. That is, instead of chilling the oils and then allowing them to temper as explained above, the mixed ingredients of oils and fats may be passed over a chill roll or any other means of supercooling the fat mixture, and from there they may pass into the well known ordinary pickertrough used for making shortenings. The fat at this time is in the supercooled state and is not yet crystallized, so that it is liquid and fluid enough to be agitated very thoroughly and to flow, and at this time the milk, salt, color or any desired margarine ingredient may be added. The product may then go directly to a pump and be pumped directly into the margarine package.

The new methods of manufacturing margarine present a number of advantages over the prior art processes, both in the processes themselves and in the products obtained. The amount of milk required to impart a satisfactory flavor to the oil base is greatly reduced. Whereas in prior art processes utilizing the process of wet crystallization, from 35 to 40% of milk, such as cultured ripened skim milk generally used in the manufacture of oleomargarine, is required, under the present method 20% or less of milk gives a satisfactory product. The amount of salt and benzoate of soda or other preservative, are also greatly reduced by the present process. The manufacturing equipment necessary is greatly simplified, and one of the important features of manufacture in accordance with the present invention is the fact that the manufacturer can make the desired margarine base at a central plant, congeal it on a chill roll, and pack it in barrels and ship to any point where it is desired to make the margarine. At the point of margarine manufacture, all that would be required would be apparatus for the preparation of the milk, a blending machine, a print cutter, and wrapping table or machine.

Thus many of the routine steps and manipulations required in prior art practice are completely eliminated by the manufacture of margarine with the margarine base by the processes herein set forth. For example, the churning of the oil with the milk, the freezing of the same on the water bath, the tempering which calls for placing into trucks and allowing to remain until the water drains from the margarine crystals, and then the kneading of these crystals together on a worker where the salt, benzoate and other desired ingredients are added, and then the blending where the colloid and ingredients such as milk are included, followed by the use of the print machine where the product is formed into prints to fit the package, and then wrapped by hand or automatically, are thus avoided. The prior art crystallizing bath, working table, etc. are eliminated, and as noted a large portion of the milk components ordinarily required is saved.

The margarines obtained by the present methods of manufacture disclosed in the instant application, also differentiate from the prior art margarines. Products that are smoother in character, and have improved taste and flavor are obtained.

One possible explanation of the possession of the products of the present invention of improved properties and characteristics over the prior art margarines is the following. In the usual prior art practice of adding ripened milk to the melted oils and agitating a water-in-oil emulsion is formed, oil globules surrounding the milk. By the method of manufacture set forth in the present application, wherein the oil admixture is first chilled and the milk or milk ingredients are added only in the blending machine, an emulsion of the other type is formed, namely that of oil-in-milk, so that the milk forms the continuous phase and the surface of the oil globules are surrounded by the milk film. The presence of such milk film on the oil globules will account for the superiority of taste of the margarines produced in accordance with the present invention over those produced in the prior art.

Further in connection with the prior art methods of manufacture, when the milk or milk components are incorporated prior to chilling, the chilling action which produces crystallization results in some segregation of ingredients in the admixture of oil and milk, so that the emulsion is at least to some extent broken down. Consequently the subsequent working operation on the working table in which some of the excessive moisture is eliminated, is required in an attempt to restore the character of the emulsion. But such restoration of the emulsified materials in their previous condition can never be complete. On the other hand, in the present invention, since the milk or milk components are not incorporated until after the oil admixture is first chilled or congealed, the blend of the oil components with the milk components is not subsequently subjected to any process which would cause segregation of ingredients from the blends obtained.

While, therefore, these suggested explanations of the superiority of products produced in accordance with the present invention over prior art products are offered as given above, it is to be understood that they are merely explanatory and it is not intended to limit the present invention by such explanations. Regardless of whether the offered explanations are correct, the products of the present invention do exhibit marked improved properties and characteristics over prior art margarines.

Having thus set forth my invention, I claim:

1. In a method of making margarine from a margarine base of components selected from edible oils and fats substantially free from milk solids, the steps of congealing the base to a supercooled uncrystallized form and incorporating a milk component.

2. The method of making margarine which comprises mixing ingredients selected from the group including vegetable and animal oils and fats to form a composition containing less than 1% of water and having a melting point below 98° F., chilling the mixture to a supercooled uncrystallized form and incorporating a milk component.

3. The method of making margarine which comprises preparing a margarine base of components selected from edible oils and fats substantially free from milk solids, chilling the margarine base to a supercooled uncrystallized form which will flow under pressure, admixing a milk component with the chilled product while retaining its property of flowing under pressure, and depositing the admixture of margarine base and milk component under pressure directly in its final package.

4. In a system of manufacturing margarine, the steps of preparing a margarine base of components selected from edible oils and fats substantially free from milk solids at a central plant, congealing the base at said plant to form a product readily miscible with a milk component, shipping the congealed base to points where margarine is to be manufactured, and blending the congealed base while in supercooled uncrystallized form with a milk component to form margarine at points of margarine manufacture removed from the central plant.

ADRIAN D. JOYCE.